April 22, 1941.  M. A. E. LEVY  2,239,460
MECHANISM FOR JUSTIFYING OF NUMBER WHEELS
Filed Jan. 14, 1939  3 Sheets-Sheet 1

M. A. E. Lévy
Inventor

By: Glascock Downing & Seebold
Attys.

April 22, 1941.  M. A. E. LEVY  2,239,460

MECHANISM FOR JUSTIFYING OF NUMBER WHEELS

Filed Jan. 14, 1939  3 Sheets-Sheet 2

M. A. E. Levy
Inventor

By: Glascock Downing & Seebold
Attys.

April 22, 1941. M. A. E. LEVY 2,239,460
MECHANISM FOR JUSTIFYING OF NUMBER WHEELS
Filed Jan. 14, 1939 3 Sheets-Sheet 3
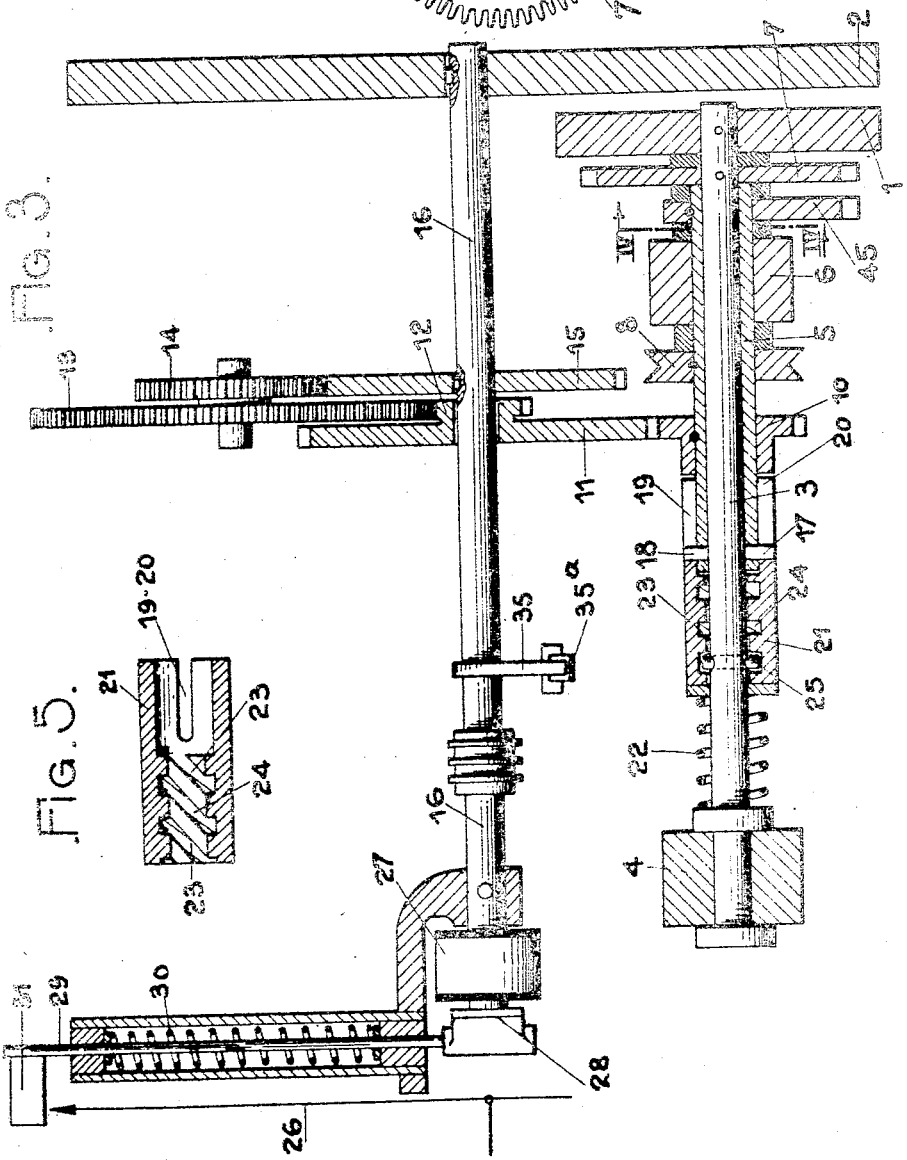

Patented Apr. 22, 1941

2,239,460

UNITED STATES PATENT OFFICE 2,239,460

MECHANISM FOR JUSTIFYING OF NUMBER WHEELS

Marcel Adrien Elie Levy, Paris, France, assignor to Societe Anonyme: Societe Francaise de Metrographie, Paris, France Application January 14, 1939, Serial No. 251,019
In France August 13, 1934

5 Claims. (Cl. 234—5.4)

This patent application is a continuation in part of my earlier patent application Serial No. 35,384 filed on August 8, 1935, for: "Improvements in numerical indicators," and certain parts of the present application will be found in the earlier application.

The invention has for object improvements in numerical indicators having juxtaposed drums which translate in aligned figures the indications given by a measuring apparatus with which said indicators are combined.

Numerical indicators of this kind which are already known all have deficiencies. Some of these indicators operate with sufficient accuracy but their operation is not rapid; others operate rapidly but often give rise to mistakes; finally, others operate rapidly and with sufficient accuracy, but the alignment of the figures is not always perfect.

The invention has for object the provision of a numerical indicator having juxtaposed drums and presenting all the following properties: rapid operation, sufficient accuracy and an always perfect alignment of the figures.

For that purpose, according to the invention, a wheel is positively combined with certain of the graduated drums (and at least with that indicating the units of the highest order), for instance by means of gears, said wheel being provided with abutments so arranged that the angular space separating them is equal to the product of the angular space separating the graduations of said graduated drum by a whole factor, the speed of said wheel provided with abutments being equal to the product of the speed of the graduated drum by the same whole factor.

The accompanying drawings illustrate, by way of example only, various forms of carrying the invention into practice.

Fig. 1 and Fig. 2 must be considered as joining according to line II—II of Fig. 1, and according to line I—I of Fig. 2.

Fig. 3 is an elevation in axial section corresponding to Fig. 1.

Fig. 4 is a side view relating to Fig. 3 and in section according to line IV—IV of Fig. 3.

Fig. 5 is a sectional view of a detail of Fig. 3.

Figure 1:
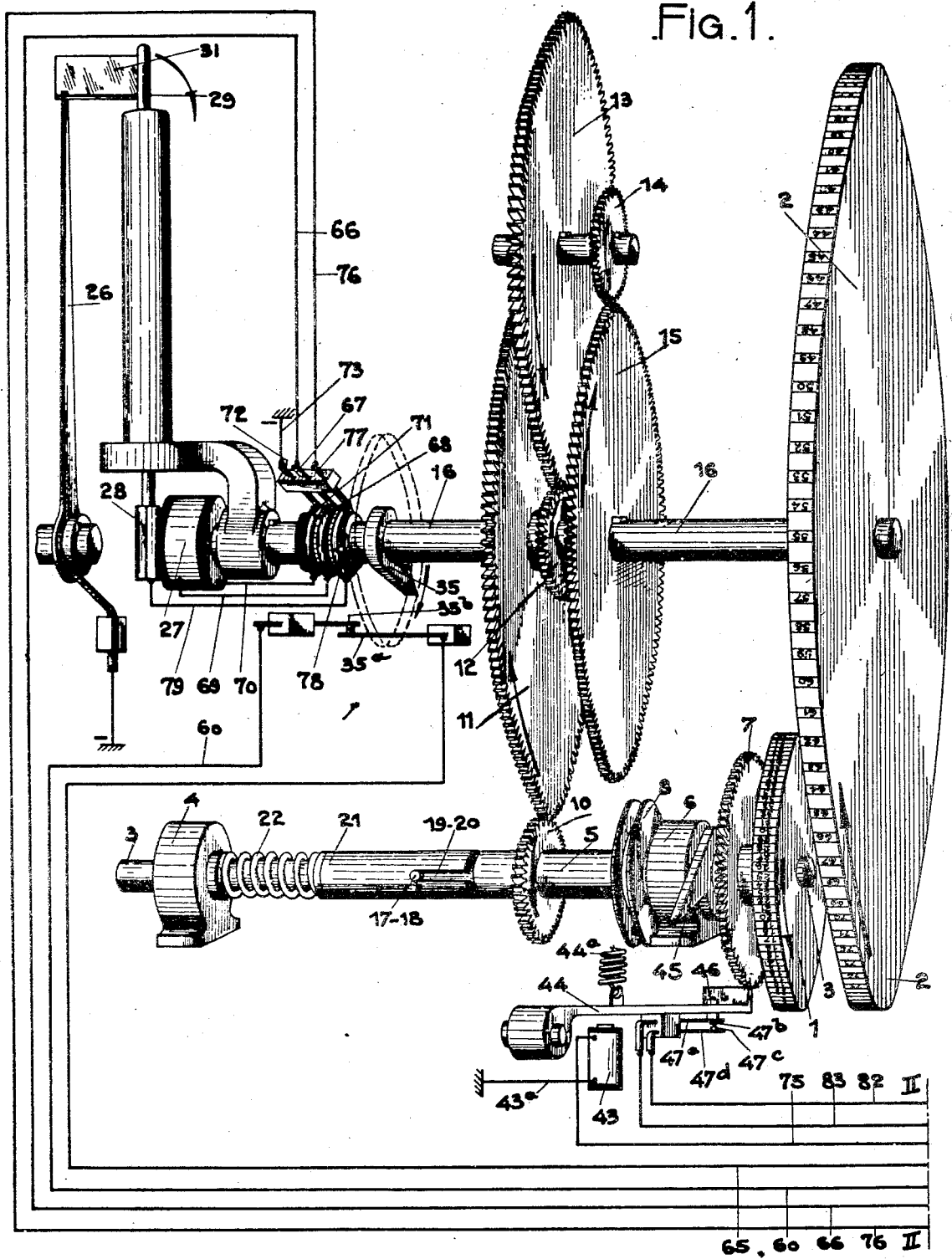
Fig. 1 is a general perspective view of the apparatus, with the exception of certain relays which are shown in Fig. 2.

In the example illustrated in Figs. 1 to 5, the apparatus comprises two graduated drums 1 and 2. The graduated drum 1 which indicates the units of the lowest order, is rigidly secured on a shaft 3, which is carried at one end by a bearing 4, and passes through a second hollow shaft 5 (Fig. 3) carried by a bearing 6. On shaft 3 is also rigidly secured a toothed wheel 7 having as many teeth as there are numbers on wheel 1. In the present example the wheel 1 has one hundred numbers, from 0 to 99, and consequently the toothed wheel 7 is provided with 100 teeth.

Figure 2:
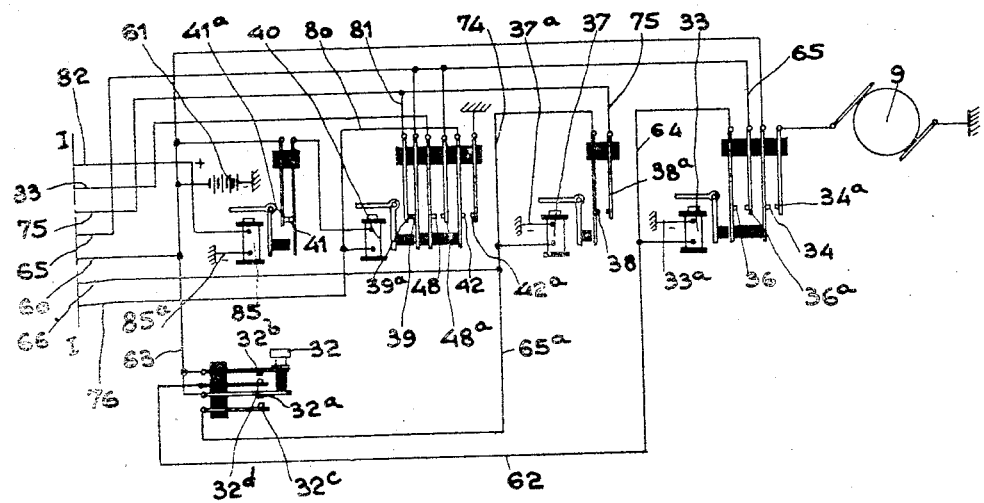

On the hollow shaft 5 is rigidly secured a wheel 8 driven by a motor, diagrammatically indicated at 9 in Fig. 2, this actuation being effected through the medium of a belt (not shown) which, when shaft 5 is locked, as will be explained later on, can slide on wheel 8. The hollow shaft 5 further carries a toothed wheel 10 which is the first one of a train of gears 11, 12, 13, 14 and 15 for the actuation of a shaft 16 carrying the graduated drum 2. In the example chosen, the drum 2 which indicates the units of the highest order rotates a hundred times less rapidly than drum 1, and comprises 100 graduations, from 0 to 99. Finally, on shaft 5 is rigidly secured a disc or wheel provided with an abutment 45, the function of which will be explained later on.

Said wheel provided with an abutment 45 constitutes, in this example, the wheel provided with abutments associated with the graduated drum 2; the angular space separating the abutments is, in this particular case, equal to 360°, since there is only one abutment. It is therefore equal to the angular space separating the graduations of the graduated drum 2, multiplied by the whole factor 100. On the other hand, the wheel 45 provided with an abutment being rigidly secured to shaft 5 rotates 100 times more rapidly than the graduated drum 2; the speed of wheel 45 provided with an abutment is therefore equal to that of the graduated drum 2, multiplied by the same whole factor 100. It is obvious that another factor might have been chosen.

The hollow shaft 5 is provided, at 17 and 18, with radial fingers entering rectilinear grooves 19 and 20 provided in a sleeve 21. The sleeve 21 therefore rotates with shaft 5, but it can axially slide thereon in antagonism to the action of a spring 22. The sleeve 21 is moreover internally provided with helical grooves indicated at 23 and 24, into which extends a finger 25 secured on shaft 3. If, for instance, shaft 3 is assumed to be held stationary, it will be seen that shaft 5 can rotate relatively to shaft 3, this rotation causing sleeve 21 to move axially in opposition to the action of spring 22, throu͏gh ͏ ͏ ͏ medium of helical grooves 23 and 24, a͏  finger 25. If, after this rotation, either of shafts 3 and 5, or both, is or are released, the spring 22, by expanding, restores both shafts 3 and 5 to their relative initial setting. The pitch of the helical grooves 23 and 24 must therefore be suitably chosen for that purpose.

The apparatus is assumed to be combined with any measuring instrument, the index of which is indicated at 26. On shaft 16 is rigidly secured, at 27, an electromagnet the armature 28 of which is rigid with an auxiliary index 29 which can rotate on its own axis and is restored by a spring 30, in such a manner that, when the electromagnet is not energized, the end 31 of the auxiliary index 29 is not in the path of index 26, but so that, when the armature 28 is attracted, the end 31 comes in the path of index 26 to meet it.

The shaft 16 carries a finger 35 which cooperates with a movable contact 35$^a$ for opening this contact when the index 29 is in its position of rest; but in all the other positions of the index 29, the contact 35$^a$ touches the fixed contact 35$^b$. The said fixed contact 35$^b$ is connected, by the wire 60, to the positive pole of a battery 61 as well as two other contacts 32$^a$ and 32$^b$ which are open in their position of rest, and which can be closed by means of a push-button 32. As explained, the contacts 35$^b$—35$^a$ are normally closed, but arranged in such a manner that, when the auxiliary arm 29 is in its position of rest, the finger 35 carried by the shaft 16 presses on contact 35$^a$ so as to open it. Consequently, in the position of rest of auxiliary arm 29, the circuits controlled by contacts 35$^a$—35$^b$ are open. It is obvious that the contact 35$^a$ remains open during a certain angular movement of the auxiliary arm 29, as said contact 35$^a$ cannot be released by finger 35 in an absolutely instantaneous manner. This angular space during which the device cannot operate corresponds to the angular space existing in the majority of measuring apparatus near the graduation zero, space in which exact measurements cannot be made.

The device comprises, in addition to the electromagnet 27, three relays designated by 33, 37 and 40; a second electromagnet 85, which is arranged for ensuring the printing of the figures carried by the drums 1 and 2, in the manner known to all technicians; and a third electromagnet 43.

The relay 33 has its winding connected, on the one hand, at 33$^a$ to the negative pole of the battery 61, and, on the other hand, to the positive pole of said battery through wire 62, contact 32$^d$, contact 32$^b$ and wire 63. The armature of relay 33, when it is attracted, moves two contacts 34 and 36 to working position. Contact 36 is open in its position of rest and it is arranged in a shunt of the circuit of relay 33; this shunt comprises wire 64, contact 36, fixed contact 36$^a$, wire 65, contact 35$^a$, contact 35$^b$, and wire 60. Contact 34 is also open in its position of rest, and it is arranged with the fixed contact 34$^a$ in the circuit of the motor 9.

The relay 37 has its winding connected, on the one hand, at 37$^a$ to the negative pole of the battery, and, on the other hand, to the positive pole of said battery through wire 65$^a$ and contacts 32$^c$ and 32$^a$ previously described. The armature of relay 37, when it is attracted, moves to working position a contact 38 which is normally open, and the function of which will be explained later on. The electromagnet 27 is placed on a shunt of the circuit of relay 37, through wire 66, wiper 67, conducting ring 68, wire 69, winding 27, wire 70, conducting ring 71, wiper 72 and negative pole of the battery at 73, so that contacts 32$^a$—32$^c$ directly control the energization of relay 37 and of electromagnet 27.

As it is necessary that electromagnet 27 should remain energized until contact 31 touches the index 26, as will be seen later on, a holding circuit must be provided for this electromagnet 27; but since said electromagnet is movable with shaft 16 it is more simple to use relay 37 which is fixed and which is placed in shunt with the electromagnet 27, for controlling said holding circuit containing wire 74, contacts 38 and 38$^a$, wire 75, contacts 39$^a$ and 39, wire 65, contacts 35$^a$—35$^b$, wire 60 and positive pole of the battery 61.

The relay 40 has its winding connected to the positive pole of the battery 61 by the contacts 41,—41$^a$ normally closed, contact 41 being controlled by the armature of the electromagnet 42, in order to open the circuit of relay 40 upon energization of said electromagnet 42. Relay 40 is connected, on the other hand to the negative pole of the battery by two shunts: one of which comprises wire 76, wiper 77, conducting ring 78, wire 79, auxiliary arm 29 with its contact 31, index 26 and negative pole of the battery 61; the other comprising wire 80 and contacts 42—42$^a$ normally open. Contact 42 is controlled by the armature of relay 40, which actuates, moreover, the contact 39 normally closed, and the contact 48 normally open.

The electromagnet 43 has its winding connected by wire 43$^a$ to the negative pole of the battery, and to the positive pole by two shunts; one of these shunts comprises wire 75 and contacts 38—38$^a$ and 32$^a$—32$^c$ whilst the other comprises wire 75, wire 81, contacts 39—39$^a$, wire 65 and contacts 35$^a$—35$^b$. The armature of the electromagnet 43 controls a pawl 44 which is restored to its position of rest by a spring 44$^a$. In this position of rest, the pawl 44 under the action of spring 44$^a$, enters one of the recesses of the toothed wheel 7, and it is wide enough to laterally extend beyond the teeth of this wheel and to obstruct the path followed by the finger 45 which is secured on the hollow shaft 5 and which rotates with it.

This finger is so arranged that when it presses against the pawl 44, the indication given by the drum 2 is exactly aligned with that given by drum 1. Moreover, in this position, the end of finger 45 presses against the end of a rod 46, which passes through pawl 44 through a hole in which it is guided. This rod 46 is pushed upwardly by a spring 47$^a$ which carries a contact 47$^b$, and which is so arranged that, when finger 45 does not press against the end of rod 46, spring 47$^a$ can relax upwardly so that its contact 47$^b$ ceases to touch contact 47$^c$ carried by a spring 47$^d$ which relaxes upwardly to an appreciably less amount than the spring 47$^a$.

The electromagnet 85 has its winding connected at 85$^a$ to the negative pole of the battery, and to the positive pole by a circuit which comprises wire 82, contacts 47$^d$ and 47$^c$, wire 83, contacts 48—48$^a$, wire 65, contacts 35$^a$—35$^b$, and wire 60.

When it is desired to record a measurement indicated by index 26, the operator presses upon the push-button 32, which simultaneously closes contacts 32$^a$—32$^c$ and 32$^b$—32$^d$. The closing of contacts 32$^b$—32$^d$ energizes relay 33, which, at contacts 34—34$^a$, closes the circuit of the motor 9 which starts to rotate and drives, through pulley 8, the shaft 5 which, in its turn, through the medium of sleeve 21, drives the shaft 3. The drums 1 and 2 therefore start to rotate, as well as the auxiliary index 29.

When index 29 has left its position of rest, contacts 35ª—35ᵇ are closed, and will remain closed until the auxiliary index 29 has again returned to its position of rest. Contacts 36—36ª of relay 33 have been closed upon energization of said relay 33; it will therefore be seen that relay 33 will remain energized until contacts 35ª—35ᵇ open.

By the closing of contacts 32ª—32ᶜ, a circuit has been closed for relay 37 and for electromagnet 27. The electromagnet 27, by energizing, moves the end 31 of auxiliary index 29 into the path of index 26. Relay 37 is maintained energized by contacts 38—38ª, contacts 39—39ª of relay 40 and closed contacts 35ª—35ᵇ.

When the end 31 of auxiliary index 29 comes in contact with the end of index 26, a circuit is closed for relay 40, this circuit comprising the contacts 41—41ª of the electromagnet 42 which is the printing electromagnet. Relay 40 is maintained energized by contacts 42—42ª. Moreover, at contacts 39—39ª it opens the holding circuit of relay 37 which falls back; electromagnet 27, which is in parallel with relay 37, also falls back, so that the end 31 of the auxiliary index 29 moves out of the path of index 26 under the action of spring 30. Besides, it will be noted that, as soon as contacts 35ª—35ᵇ have been closed, the electromagnet 43 has been energized by a circuit which also included contacts 39ª—39ᵇ. The opening of said contacts therefore de-energizes electromagnet 43.

As already explained, the armature of electromagnet 43 controls a pawl 44 which, when electromagnet 43 is deenergized, comes in engagement with the teeth of wheel 7 and comes in the path of the finger 45 carried by shaft 5. Consequently, as soon as the electromagnet 43 de-energizes, wheel 7 is immediately locked and drum 1 is stopped in proper printing position. Unless drum 1 indicates zero, finger 45 does not immediately abut against finger 44, as, in the initial position of shafts 3 and 5, the finger 45 is arranged for exactly corresponding with the tooth of wheel 7 which itself corresponds to the zero of drum 1. Consequently, although drum 1 is stopped, the shaft 5 continues to rotate and, consequently drum 2 also rotates, until finger 45 abuts against finger 44. It is obvious that, at this moment, drum 2 is also in proper printing position.

When finger 45 abuts against finger 44, it ensures, through the push-piece 46, the closing of contacts 47ᵇ—47ᶜ which are arranged in the circuit of the printing electro-magnet 85 in series with the contacts 48—48ª of relay 40.

When contacts 47ª—47ᵇ close, the electromagnet 85 is energized, and ensures the printing of the indications given at this moment by drums 1 and 2. Moreover, at contacts 41—41ª, it opens the circuit of relay 40 which falls back. At 39—39ª, the circuit of electromagnet 43 is again closed, and finger 44 releases the wheel 7 and finger 45. As soon as these members have been released, shaft 5 resumes its rotation and, moreover, spring 22, by expanding, restores shafts 3 and 5 to their relative initial angular setting. When the auxiliary index 29 returns to its position of rest, contacts 35ª—35ᵇ open, this causing all the circuits to be opened. Relay 33 falls back, and the motor 9 is no longer supplied with current. Electromagnet 43 also falls back, and finger 44 again holds wheel 7 and finger 45 stationary in position zero.

Figure 6:
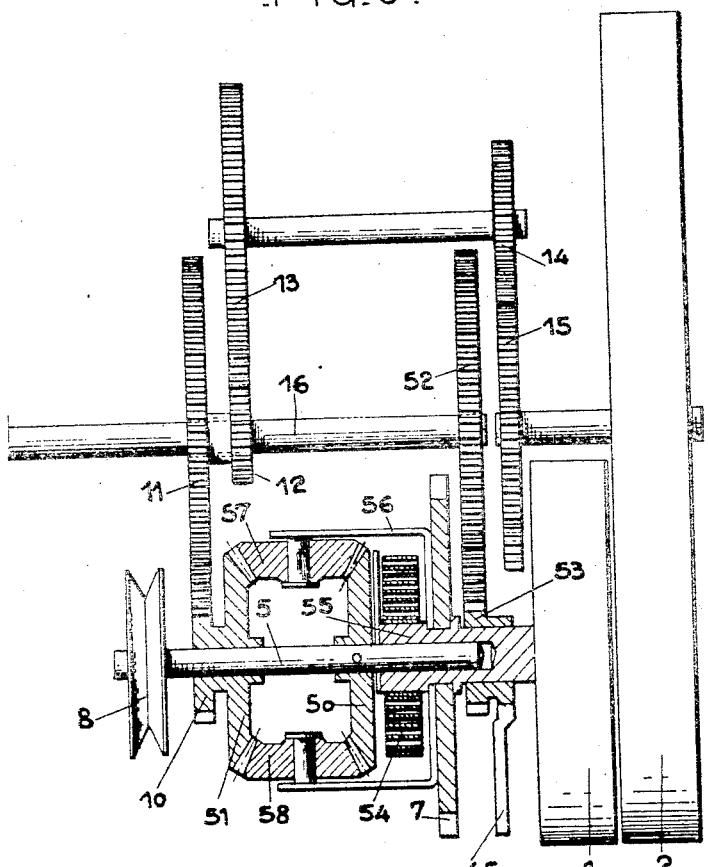
Fig. 6 is an elevation of a modification.

In the example which has just been described, the movement of alignment of drum 2 takes place in the same direction as the previous rotation, so that, at rest, drum 2 must be offset one step backward relatively to the direction of rotation of this drum 2, in such a manner that, drum 1 indicating zero, drum 2 indicates the highest number of its graduation, that is to say 99. But this shifting can also be avoided by causing the movement of alignment of drum 2 to take place backwardly, for instance by the means described with reference to Fig. 6.

In this example, shaft 5 actuates one of the sun wheels 50 of a differential gear. The other sun wheel 51 is loose on shaft 5 and drives drum 2 through the medium of gears 10, 11, 12, 13, 14 and 15, as in the preceding example. Moreover, through a wheel 52 on shaft 16, and through a wheel 53, the wheel 51 drives at its own speed the finger 45.

A spiral spring 54 (which replaces the resilient coupling of the preceding example) connects the wheel 50 and sleeve 55 which is loose on shaft 5. Through the spring 54 wheel 50 drives sleeve 55 on which drum 1 and wheel 7 are rigidly secured. Moreover, the support 56 of the planet pinions 57 and 58 is also secured on sleeve 55, and the wheel 53 with finger 45 loose on said shaft 55.

At the beginning of the operation, shaft 5 drives wheel 50 and said wheel 50 drives the sleeve 55 through the medium of spring 54 which is sufficiently powerful for driving said sleeve without yielding. Therefore, the support 56 rotates with wheel 50, and consequently, wheel 51 rotates in the same manner as if it was rigidly secured on shaft 5.

When the pawl 44 engages with the teeth of wheel 7, the latter is held stationary; the support 56 can no longer rotate and, consequently, the wheel 50 causes spring 54 to yield by continuing to rotate. But it will then be seen that wheel 51 (and consequently wheel 2) rotates in a direction reverse to the preceding movement, until finger 45 abuts against pawl 44 for effecting the alignment.

What I claim as my invention and desire to secure by Letters Patent is:

1. In a mechanism for justifying of number wheels, a driving shaft, a first graduated drum for indicating digits of the lowest order, a resilient coupling between the driving shaft and said first drum, a toothed wheel secured to said first drum and having a number of teeth equal to the number of graduations of said first drum, a second graduated drum for indicating digits of the highest order, a wheel provided with at least one abutment, means for transmitting the movement of the driving shaft to said second drum at a speed which is a fraction of the speed of the driving shaft, means for transmitting the movement of the driving shaft to the wheel provided with at least one abutment at a speed greater than the speed of said second drum, and stopping means arranged for engaging with the toothed wheel secured on the first drum and with the wheel provided with at least one abutment.

2. In a mechanism for justifying of number wheels, a driving shaft, a first graduated drum for indicating the digits of the lowest order, a resilient coupling between the driving shaft and said first drum, a toothed wheel secured to said first drum and having a number of teeth equal to the number of graduations of said first drum, a second graduated drum for indicating digits of the highest order, a wheel provided with at least one abutment, means for transmitting the movement of the driving shaft to said second drum at a speed which is a fraction of the speed of the driving shaft, means for transmitting the movement of the driving shaft to the wheel provided with at least one abutment at a speed equal to that of the driving shaft, and stopping means arranged for engaging with the toothed wheel secured on the first drum and with the wheel provided with at least one abutment.

3. In a mechanism for justifying of number wheels, a driving shaft, a first graduated drum for indicating digits of the lowest order, a resilient coupling between the driving shaft and said first drum, a toothed wheel secured to said first drum and having a number of teeth equal to the number of graduations of said first drum, a second graduated drum for indicating digits of the highest order, a wheel provided with abutments the number of which is equal to that of the graduations of said second drum divided by a whole factor, means for transmitting the movement of the driving shaft to the said second drum at a speed which is a fraction of the speed of the driving shaft, means for transmitting the movement of the driving shaft to the wheel provided with the abutments at a speed which is equal to that of the second drum multiplied by the same whole factor, and stopping means arranged for engaging with the toothed wheel secured on the first drum and with the wheel provided with abutments.

4. In a mechanism for justifying of number wheels, a driving shaft, a first graduated drum for indicating digits of the lowest order, a resilient coupling between the driving shaft and said first drum, a toothed wheel secured to said first drum and having a number of teeth equal to the number of graduations of said first drum, a second graduated drum for indicating digits of the highest order, a wheel provided with at least one abutment, means for transmitting the movement of the driving shaft to said second drum at a speed which is a fraction of the speed of the driving shaft, said means comprising a differential gear formed by two sun wheels, planet wheels and a support for the said planet wheels, means for securing one of the sun wheels to the driving shaft, means for rigidly securing the support to the first drum, means for transmitting the movement of the driving shaft to the wheel provided with at least one abutment at a speed greater than the speed of said second drum, and stopping means arranged for engaging with the toothed wheel secured on the first drum and with the wheel provided with at least one abutment.

5. In a mechanism for justifying of number wheels, a driving shaft, a first drum bearing graduations arranged for indicating digits of the lowest order, a first wheel provided with abutments in number equal to the number of graduations carried by the first graduated drum, means for giving to the first wheel provided with abutments a constant angular relation relatively to the first graduated drum, a second drum bearing graduations arranged for indicating digits of the highest order, a second wheel provided with abutments so arranged that the angular space separating them is equal to the product of the angular space separating the graduations of the second graduated drum by a whole factor; means comprising a torque limiting device for kinematically connecting the driving shaft to the first graduated drum, to the second graduated drum and to the second wheel provided with abutments, said means being so arranged that the speed of the first graduated drum is an exact multiple of the speed of the second graduated drum, and so that the speed of the second wheel provided with abutments is equal to the product of the speed of the second graduated drum by a whole factor equal to the preceding one, and stop means arranged for cooperating with both wheels provided with abutments.

MARCEL ADRIEN ELIE LEVY.